United States Patent
Hamada (10) Patent No.: US 7,397,920 B2
(45) Date of Patent: Jul. 8, 2008

(54) INFORMATION PROCESSING DEVICE AND METHOD, AND RECORDING MEDIUM

(75) Inventor: Ichiro Hamada, Kanagawa (JP)

(73) Assignee: Sony Corporation (JP)

( * ) Notice: Subject to any disclaimer, the term of this patent is extended or adjusted under 35 U.S.C. 154(b) by 716 days.

(21) Appl. No.: 09/976,476

(22) Filed: Feb. 8, 2002

(65) Prior Publication Data

US 2002/0080963 A1  Jun. 27, 2002

(30) Foreign Application Priority Data

Oct. 13, 2000  (JP) .......................... P2000-313239

(51) Int. Cl.
*H04N 7/167* (2006.01)
*H04N 7/00* (2006.01)

(52) U.S. Cl. ...................... 380/237; 380/236

(58) Field of Classification Search ............... 380/2, 380/210, 216, 217, 236, 237; 713/151, 152; 725/31

See application file for complete search history.

(56) References Cited

U.S. PATENT DOCUMENTS

| | | | |
|---|---|---|---|
| 4,197,502 A * | 4/1980 | Sumner et al. | 375/316 |
| 5,199,069 A * | 3/1993 | Barrett et al. | 380/28 |
| 5,271,011 A | 12/1993 | McMullan, Jr. et al. | |
| 5,509,122 A * | 4/1996 | Bartow et al. | 709/227 |
| 5,918,205 A * | 6/1999 | Dierke | 704/230 |
| 6,212,633 B1 * | 4/2001 | Levy et al. | 713/153 |
| 6,947,422 B1 * | 9/2005 | Ichimura et al. | 370/392 |
| 7,130,958 B2 * | 10/2006 | Chou et al. | 711/103 |

FOREIGN PATENT DOCUMENTS

| | | |
|---|---|---|
| EP | 0 818 923 A2 | 1/1998 |
| JP | 61224630 | 10/1986 |
| WO | WO 00/52684 A1 * | 9/2000 |

OTHER PUBLICATIONS

The Association of Musical Electronics Industry, "MIDI Media Adaptation Layer for IEEE-1394," Version 1.0, 2000.*

* cited by examiner

*Primary Examiner*—Matthew Heneghan
(74) *Attorney, Agent, or Firm*—Lerner, David, Littenberg, Krumholz & Mentlik, LLP (57) ABSTRACT

Data input to an encrypting/decoding portion are input to an erroneous decoding detector. The erroneous decoding detector judges whether the data input are correctly decoded or not. For example, if it is judged that audio data input are not correctly decoded, the erroneous decoding detector does not output the audio data or outputs data indicating silence, thereby executing mute processing.

9 Claims, 10 Drawing Sheets

| 0 | | 7 | 8 | 15 | 16 17 | 18 20 | 22 | 23 24 | 31 |
|---|---|---|---|---|---|---|---|---|---|
| 0 | 0 | SID | | DBS | FN | QPC | SPH | Rsv | DBC |
| 1 | 0 | FMT | | FDF | | SYT | | | |

INFORMATION PROCESSING DEVICE AND METHOD, AND RECORDING MEDIUM

CROSS-REFERENCE TO RELATED APPLICATIONS

The present application claims priority from Japanese Application No. P2000-313239 filed Oct. 13, 2000, the disclosure of which is hereby incorporated by reference herein.

BACKGROUND OF THE INVENTION

The present invention relates to an information processing device and method, and a recording medium, and particularly to an information processing device and method which are suitably used for a device for decrypting encrypted data, and a recording medium.

For example, in satellite broadcasts for distributing programs through a satellite, the program data are encrypted and then distributed to audiences so that a person who has no contract (i.e., a non-contractor) is prevented from watching/listening to the program. Accordingly, when the receiver of a person who has made a contract (i.e., a contractor) receives encrypted data, the encryption of the data thus received is canceled, and the contractor can watch/listen to the programs. On the other hand, when the receiver of a non-contractor receives encrypted data, the data are not decrypted and thus the non-contractor cannot watch/listen to the programs.

A key for decrypting the encrypted data (i.e., a key for authentication) is stored in the receiver for receiving the encrypted data as described above, and the encryption of the data is canceled (i.e., the encrypted data are decoded by using the key). The key is renewed every predetermined period so that a non-contractor is prevented from unjustly using the information of the key itself.

Communications of encrypted data (i.e., encrypted communications) are also carried out in a digital interface, such as an IEEE1394 interface. In the case of such encrypted communications, devices that mutually make communications with each other execute authentication processing, and if it is judged that the reception/delivery of the contents is permitted therebetween, the content-receiving side can decode (decrypt) the encrypted data (i.e., cancel the encryption) by jointly owning a key for canceling the encryption. In this encrypted communication, the key is renewed every predetermined period.

When the renewal processing of the key fails, the encrypted data cannot be decoded in some cases. Further, the decoding may fail due to other causes. When the decoding fails, backup may be carried out for decoding-failed data. Even when backup is not indispensable, noises may occur.

SUMMARY OF THE INVENTION

The present invention has an object to prevent the occurrence of noise by executing mute processing when it is judged that decryption has failed.

An information processing device according to the present invention includes a decoder operable to decode encrypted data; a judging unit operable to judge whether the encrypted data has been properly decoded; and an output stop unit operable to stop the output of data from the decoder to a subsequent processing step when it is judged by the judging unit that the encrypted data has not been properly decoded.

There further may be provided an output unit operable to output to the subsequent processing step data indicating that the data output from the decoder is invalid when the output of the data from the decoder is stopped by the output stop unit.

When the judging unit judges that the encrypted data has been properly decoded after the output of the data from the decoder has been stopped by the output stop unit, the operation of the output stop unit is canceled after a predetermined time has elapsed, whereby the output of the data from the decoder is resumed.

Further, an information processing method according to the present invention includes decoding encrypted data; judging whether the encrypted data has been properly decoded; and stopping the output of data from the decoding step to a subsequent processing step when the judging step judges that the encrypted data has not been properly decoded.

Still further, a recording medium according to the present invention is recorded with a program which includes decoding encrypted data; judging whether the encrypted data has been properly decoded; and stopping the output of data from the decoding step to a subsequent processing step when the judging step judges that the encrypted data has not been properly decoded.

In the information processing device, the information processing method and the recording medium according to the present invention, it is judged whether the encrypted data has been properly decoded, and if it is judged that the encrypted data has not been properly decoded, the output of the decoded data to a subsequent processing step is stopped. Accordingly, the occurrence of noise due to improperly decoded data can be prevented.

DETAILED DESCRIPTION

Preferred embodiments according to the present invention will be described hereafter with reference to the accompanying drawings.

Figure 1:
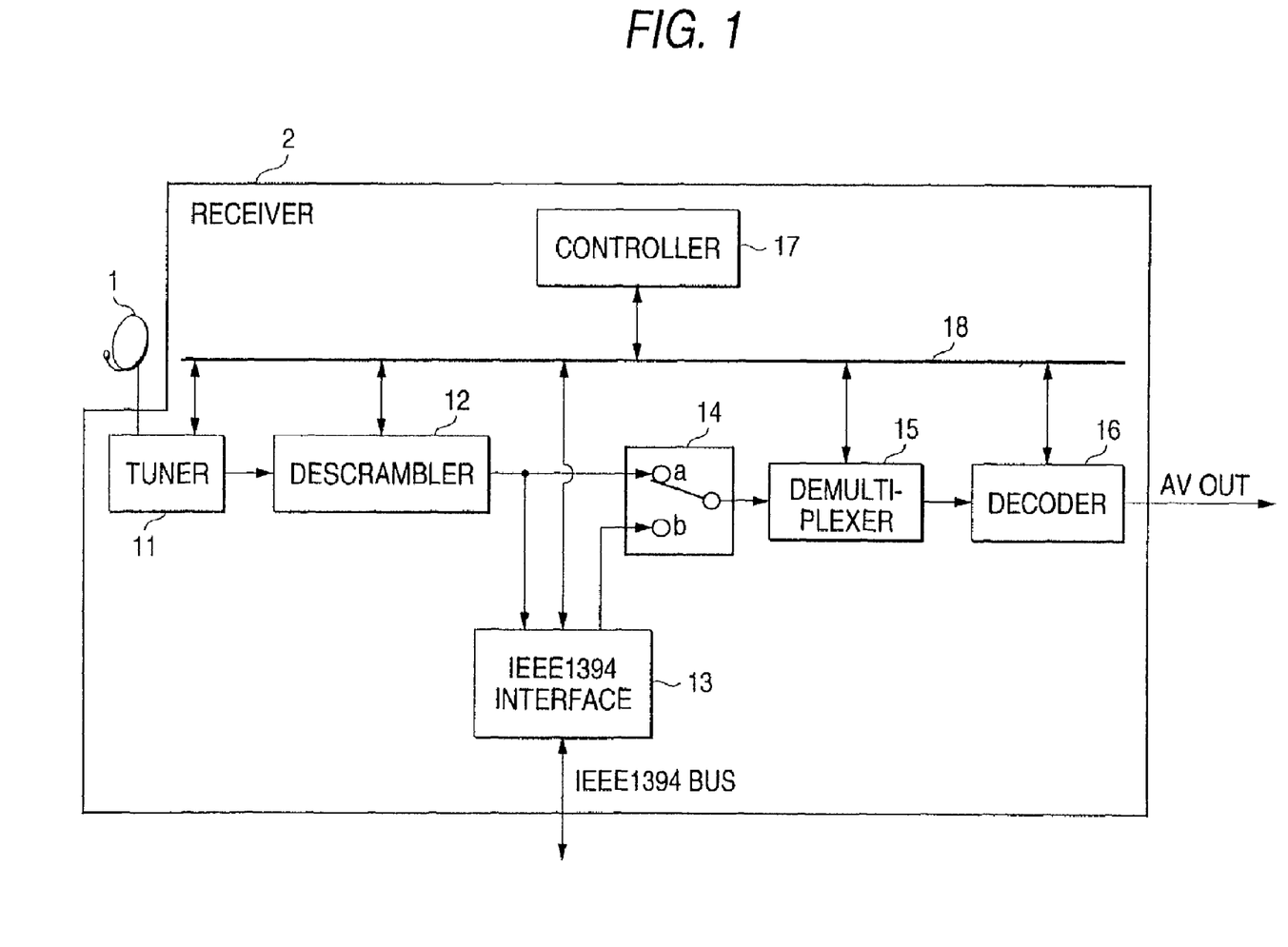
FIG. 1 is a diagram showing the construction of an embodiment of a receiver to which the present invention is applied.

FIG. 1 is a diagram showing the construction of an embodiment of a receiver 2. In the following description, it is assumed that IEEE1394 is used as an interface for communications. Digital data received by an antenna 1 are input to a tuner 11 of the receiver 2. The tuner 11 extracts data of a program which a user indicates, and outputs the data thus extracted to a descrambler 12. Usually, digital data distributed by a digital broadcast are scrambled so that an audience who makes no contract is prevented from watching/listening to the digital data. The descrambler 12 executes the process of canceling the scramble applied to the input digital data when it is judged that watching/listening is permitted.

The digital data thus descrambled are output to an IEEE1394 interface 13 and to a terminal a of a switch 14. The IEEE1394 interface 13 is connected to an IEEE1394-based bus, and it is connected through the bus to an HDD video recorder or a digital television receiver (both are not shown).

The digital data output to the terminal a of the switch 14 are output to a demultiplexer 15 when the switch 14 is connected to the terminal a side. The demultiplexer 15 extracts video data, audio data, etc. from the digital data input, and outputs these data to a decoder 16. The decoder 16 subjects the input video data and audio data to decode processing based on a predetermined system following standard procedures to generate analog video signals and audio signals. The output from the decoder 16 is supplied to a video tape recorder (not shown) connected to the decoder 16 through a predetermined cable.

A controller 17 controls each part of the receiver 2. Further, the respective parts described above are mutually connected to one another by the bus 18.

Figure 2:
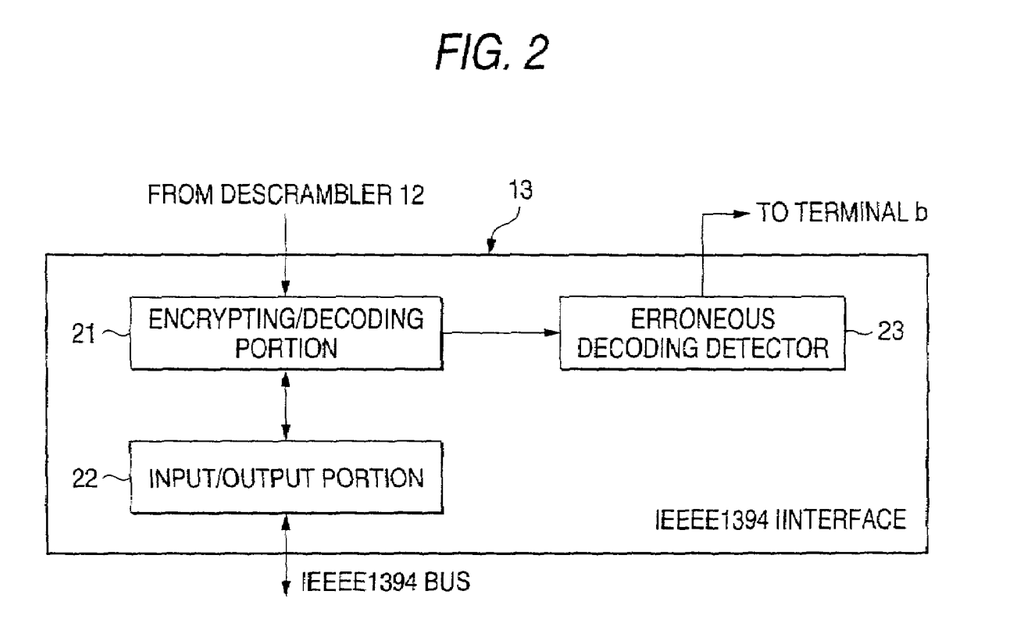
FIG. 2 is a diagram showing the internal construction of an IEEE1394 interface.

FIG. 2 is a diagram showing the internal construction of the IEEE1394 interface 13. The data descrambled by the descrambler 12 are input to an encrypting/decoding portion 21. If necessary, the data are encrypted and output through an input/output portion 22 to another device connected by the IEEE1394 bus. Data input through the IEEE1394 interface 13 are input through the input/output portion 22 to the encrypting/decoding portion 21. Here, when the data input are encrypted, the data are decoded by the encrypting/decoding portion 21, and output through an erroneous decoding detector 23 to a terminal b of the switch 14.

The data handled by the receiver 2 thus constructed will be described. In the following description, communications based on the IEC60958 standard in the IEEE1394 standards are described as an example. Further, audio data will be mainly described. The system of the IEC60958 standard is used for optical digital audio communications, and it is equipped as digital communication means for sounds to digital audio equipment such as MD (Mini Disk), or CD (Compact Disk). Digital copies of music pieces are carried out from CD to MD by this data communication system.

Figure 3:
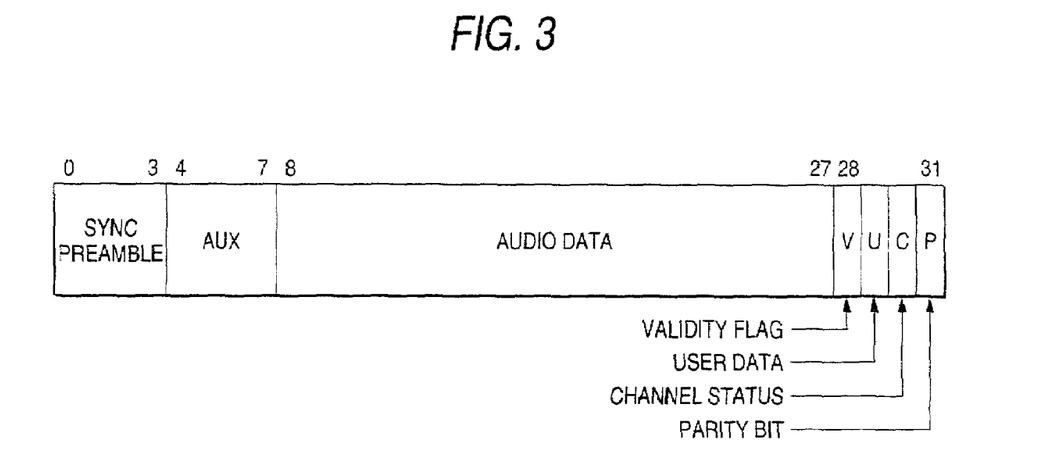
FIG. 3 is a diagram showing a sub-frame format.
Figure 4:
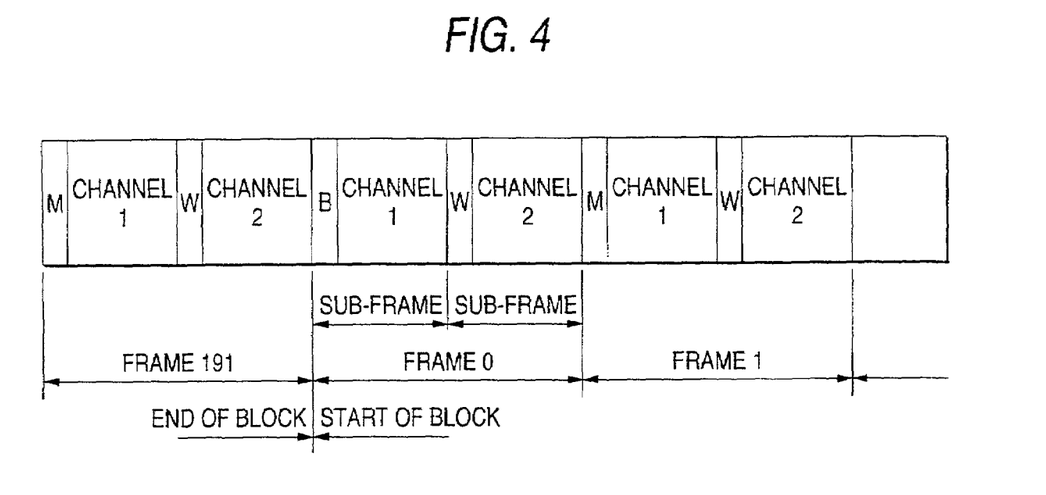
FIG. 4 is a diagram showing a frame format.

The data structure of the IEC60953 standard is shown in FIGS. 3 and 4. FIG. 3 shows a Sub-frame format of audio data. A Sub-frame corresponds to one sample of the audio data, and, for example, in the case of music data having a sampling frequency of 44.1 KHz, the sub-frame corresponds to data of each of the left channel and the right channel of one sample. Accordingly, in the case of music data of 44.1 KHz in sampling frequency, Sub-frames whose number is equal to 44100×2 are contained per second. The Sub-frame comprises Sync Preamble indicating the head of data and a data portion.

In the Frame format of FIG. 4, Frame data is represented by two Sub-frames, an assembly of 192 Frame data corresponds to block data, and an assembly of block data corresponds to audio data. Here, in Sync Preamble corresponding to the head of Sub-Frame, the head of Channel 1 at the head of Block takes a B code, the head of the other Channels 1 (right channel or left channel) takes an M code, and the head of Channel 2 (the channel at the opposite side of the Channel 1) takes a W code. By detecting these codes, the head of Sub-frame, the place of Block are detected.

Figure 5:
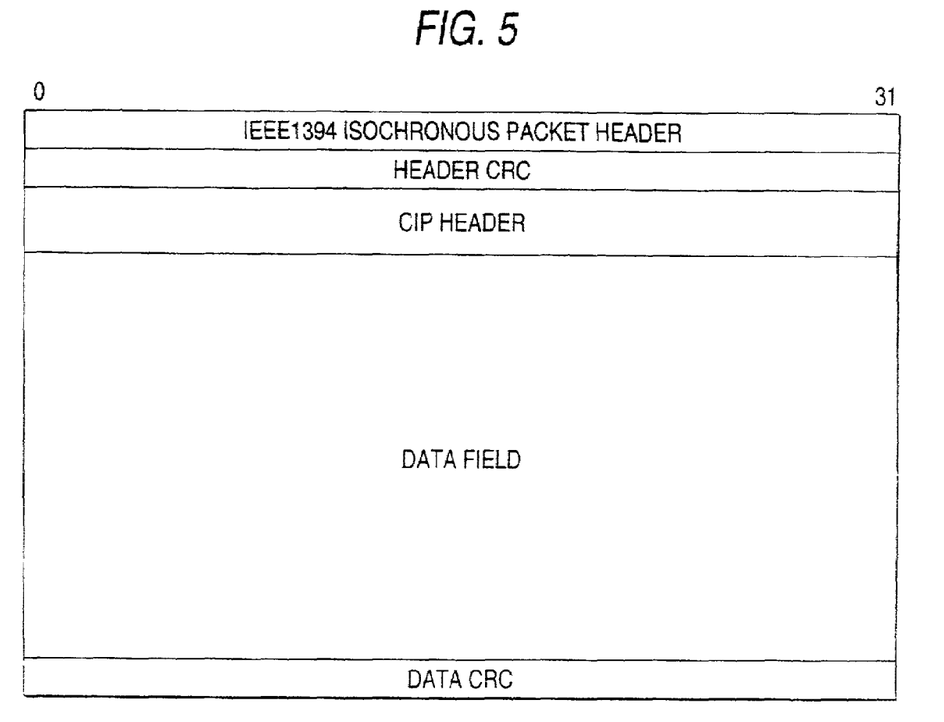
FIG. 5 is a diagram showing the format of an isochronous packet.

FIG. 5 shows the format of an isochronous packet (Isochronous packet) of the IEEE1394 standard. The isochronous packet comprises a 1394 isochronous packet header, a header CRC, a CIP header, a data field and a data CRC. When encrypted data are transmitted, these data are transmitted while only the data of the data field are encrypted. Further, the data of the data field contain plural audio data described with reference to FIGS. 3 and 4.

Figure 6:
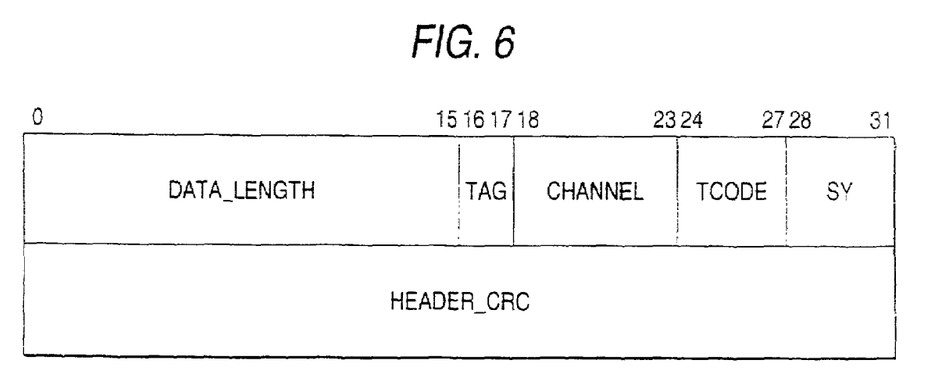
FIG. 6 is a diagram showing the format of an isochronous packet header.

Two quadlets (2×8 bytes) of the head of the isochronous packet correspond to an IEEE1394 isochronous packet header, and the details thereof are shown in FIG. 6. In this header are disposed data_length representing the size of data to be disposed subsequently to the two quadlets of this header, tag representing whether a CIP header is added in the data field (data_field), channel representing the channel of the transmission side, tcode (transaction code) representing the code of a transaction and sy representing a synchronization code. Further, header_CRC serving as an error detection code in the header is disposed at the final position.

Figure 7:
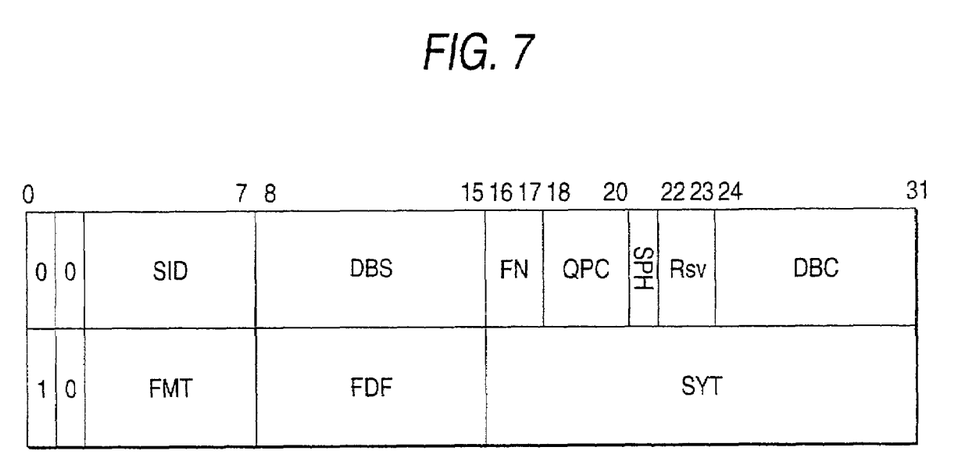
FIG. 7 is a diagram showing the format of a CIP header.

FIG. 7 is a diagram showing the details of the CIP header. In the CIP header are disposed SID (Source node ID) representing the node ID of the transmission source and DBS (Data Block Size in quadlets) representing the block size of the data. Subsequently, FN (Fraction Number) is disposed. This represents the number of blocks into which one source packet is divided. Next, QPC (Quadlet Padding Count) represents the number of dummy quadlets added, and SPH (Source Packet Header flag) is a flag indicating whether a source packet has a source packet header.

Subsequently, Rsv (reserved) is reserved for the future, and DBC (Data Block Continuity counter) represents a sequential data block count value for detecting the loss of data blocks. On the next line are provided FMT (Format ID) indicating the type of the data format, and FDF (Format Dependent Field) in which the value corresponding to the Format is recorded. Subsequently, SYT represents a field of a time stamp, and it is used to perform frame synchronization in DVCR (digital video cassette recorder).

The source packet described with reference to FIGS. 3 and 4 is inserted in the data field as described above. Data CRC represents an error detection code in the data field.

Figure 8:
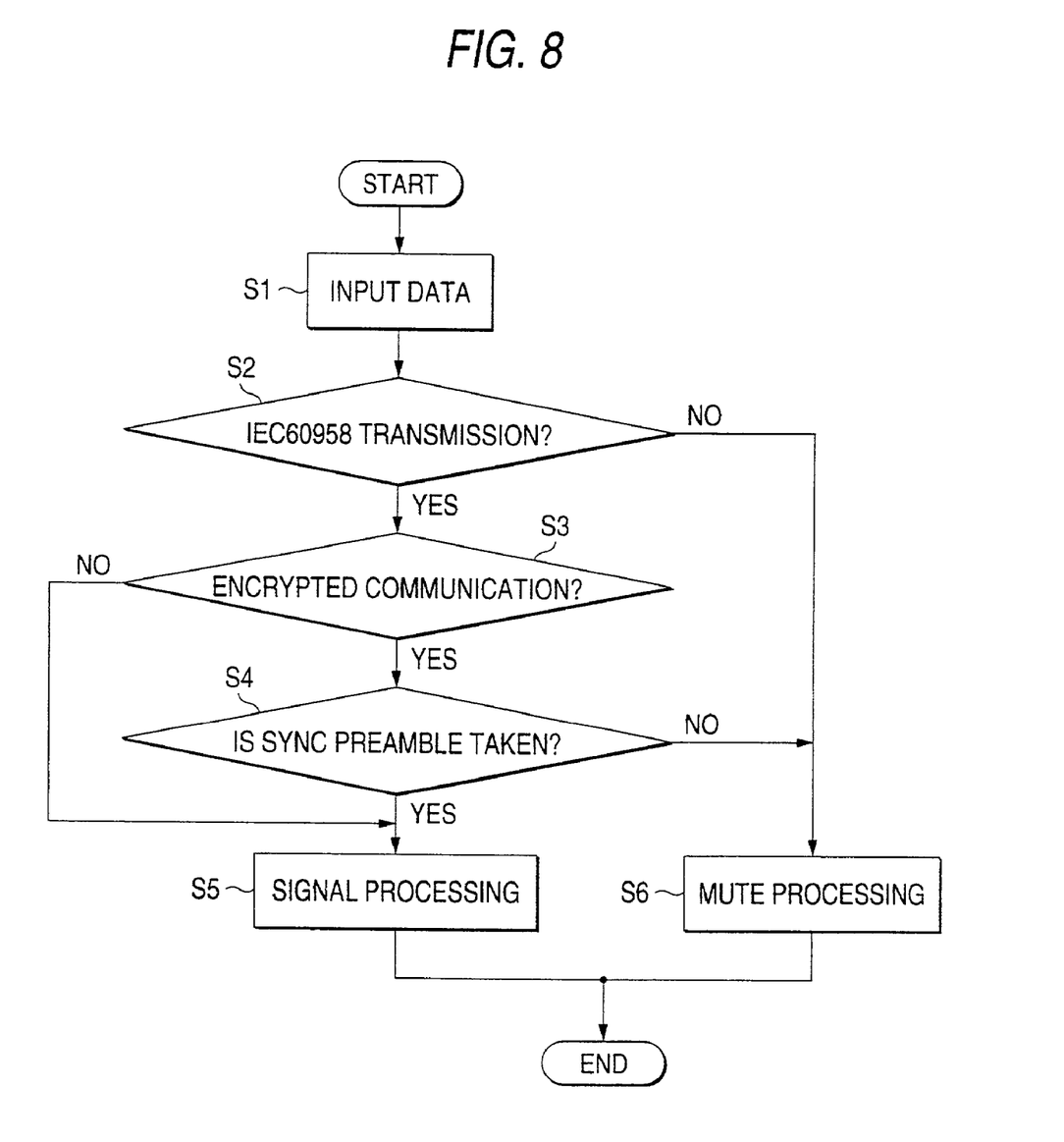
FIG. 8 is a flowchart showing the operation of the IEEE1394 interface.

The operation of the receiver 2 shown in FIG. 1 to handle such packet data will be described with reference to the flow-chart of FIG. 8. In step S1, data are input to the input/output portion 22 of the IEEE1394 interface 13. The data input to the input/output portion 22 are further input to the encrypting/decoding portion 21. When the data input are encrypted data, the encrypting/decoding portion 21 decodes the data and then outputs the data decoded to the erroneous decoding detector 23. The erroneous decoding detector 23 judges in step S2 whether the input data are data transmitted by the system of the IEC60958 standard. The judgment as to whether the data are transmitted by the system of the IEC60958 standard, in other words, is equivalent to whether the decoded data are audio data or not.

By referring to the data, the erroneous decoding detector 23 can judge whether the data are transmitted by the system of the IEC60958 standard. That is, the judgment can be made on the basis of the data written in the FMT field of the CIP header (FIG. 7) in the format of the IEEE1394 isochronous packet shown in FIG. 5. If it is judged in step S2 that the data to be decoded are data transmitted by the system of the IEC60958 standard, the processing goes to step S3 to judge whether the data written in the data field (FIG. 5) are encrypted data or not.

The judgment of the step S3 is carried out by referring to the data written in the sy field of the isochronous packet header (FIG. 6). Specifically, when the first two bits of the 4-bit data written in the sy field are out of "00", the data are judged to be encrypted data. If it is judged in step S3 that the data are encrypted data, the processing goes to step S4 to judge whether Sync Preamble is correctly decoded.

The judgment that Sync Preamble is not correctly decoded may be made due to failure of decoding of received data or failure of reception itself. In any case, when the audio data for which the decoding fails are directly output to the subsequent processing, it means that meaningless data are processed, so that this processing causes noise.

If it is judged in step S4 that Sync Preamble is correctly decoded, in other words, it is judged that correct decoding can be performed as the audio data, the processing goes to step S5, and the data are output to the subsequent-stage processing, that is, the terminal b in this case. The processing of the step S5 is also carried out when it is judged in step S3 that the communication is not an encrypted communication.

On the other hand, if it is judged in step S4 that Sync Preamble is not correctly decoded, in other words, it is judged that the correct decoding cannot be performed as the audio data, the processing goes to step S6. In step S6, mute processing is carried out. As described above, when the data which cannot be correctly decoded as the audio data are directly processed, it causes noise. Therefore, in order to avoid this (prevent occurrence of noise), the mute (sound-emission preventing) processing is carried out.

As the mute processing of the step S6, the output of the data from the erroneous decoding detector 23 to the terminal b may be stopped or data indicating silence (silence-indicating data based on the format of IEC60958) may be output. The processing of the step S6 is also carried out when it is judged in step S2 that the data are not the data transmitted by the system of the IEC60958 standard. The judgment that the data are not the data transmitted by the system of the IEC60958 standard means that the data are not audio data, and thus the mute processing is executed. Mute processing methods other than described above may be used as the mute processing.

As described above, it is judged whether Sync Preamble defined by the IEC60958 standard is correctly decoded, and only when the decoding is correctly carried out, the data are finally output to a speaker (sound output device), whereby occurrence of noise can be prevented.

Here, if it is judged that the decoding of data received fails due to some cause, occurrence of noise can be prevented by executing the mute processing, however, the mute processing should not be continued without any action. For example, in a case where it is judged that the decoding is not correctly carried out due to some cause and thus the mute processing is executed although the data decoding is correctly carried out, if the execution of the mute processing is continued, there occurs such a problem that not only a wrong recognition such as breakage of the receiver 2 is given to a listener, but also service cannot be surely supplied.

Therefore, when it is judged that the decoding has failed and thus the mute processing is executed, it is necessary to cancel the mute processing again at the time when it is judged that the decoding is successful. However, if the mute processing is immediately canceled at the time when it is judged that the decoding is successful, for example, if the decoding fails immediately and the state is returned to the mute processing state, the sound is interrupted and thus it is hard to hear. Therefore, when it is judged that the decoding has failed, the mute processing is immediately executed, and then the mute processing is canceled at the time when it is judged that decoding has been continuously successful for N data (for example, data of about 0.5 second in time). With this operation, the natural mute processing can be supplied to the listener.

Figure 9:
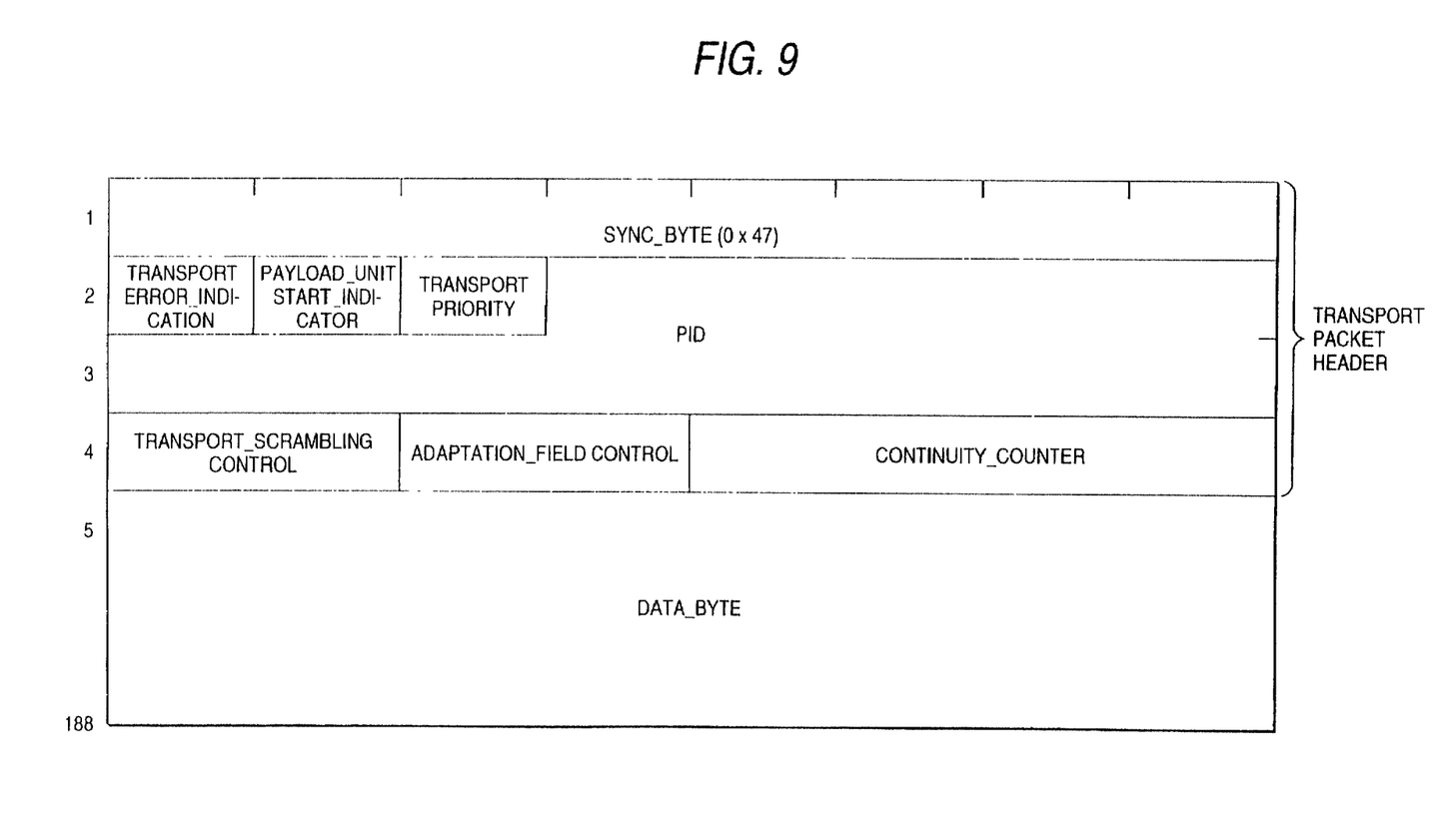
FIG. 9 is a diagram showing the format of an MPEG transport packet.

The above description is made on the assumption that the data are transmitted by the system of the IEC60958 standard, however, the present invention may be applied to data transmitted by the system of the MPEG standard. In the transmission of the IEEE1394-standard system of the MPEG standard, MPEG Transport Packet defined by a plan paper of ISO/IEC13818-1 Generic Coding of Moving Picture and Associated Audio: System Recommendation H. 222.0 is transmitted by IEEE1394. The transmission of IEEE1394 is based on the same format (FIG. 5) as the audio data defined by the above IEC61883-4, however, a time stamp and a transport packet shown in FIG. 9 are inserted into the data field.

The packet header of the transport packet shown in FIG. 9 will be described. "sync_byte" represents a field indicating a synchronization byte of 8 bits. "transport_error_indication" represents a flag of one bit, and when it is set to 1, it indicates that at least a non-correctable bit error of one bit exists in the transport stream. "payload_unit_start_indicator" represents a flag of one bit, and when it is set to 1, it indicates that the payload of this transport stream packet starts from the first byte of a PES packet. When it is set to 0, it indicates that the PES packet does not start at this transport packet.

"transport_priority" represents an identifier of one bit, and when it is set to 1, it indicates that the packet concerned has a high priority over the other packets having the same PID in which the identifier is not set to 1. PID represents a field of 13 bits, and indicates the type of data accumulated in the packet payload. "transport_scrambling_control" represents a field of 2 bits, and indicates the scramble mode of the payload of the transport stream packet.

"adaptation_field_control" represents a field of 2 bits, and indicates that at least one of the adaptation field and the payload is provided after the transport stream packet header. "continuity_counter" represents a field of 4 bits that increases every transport stream packet having the same PID.

Figure 10:
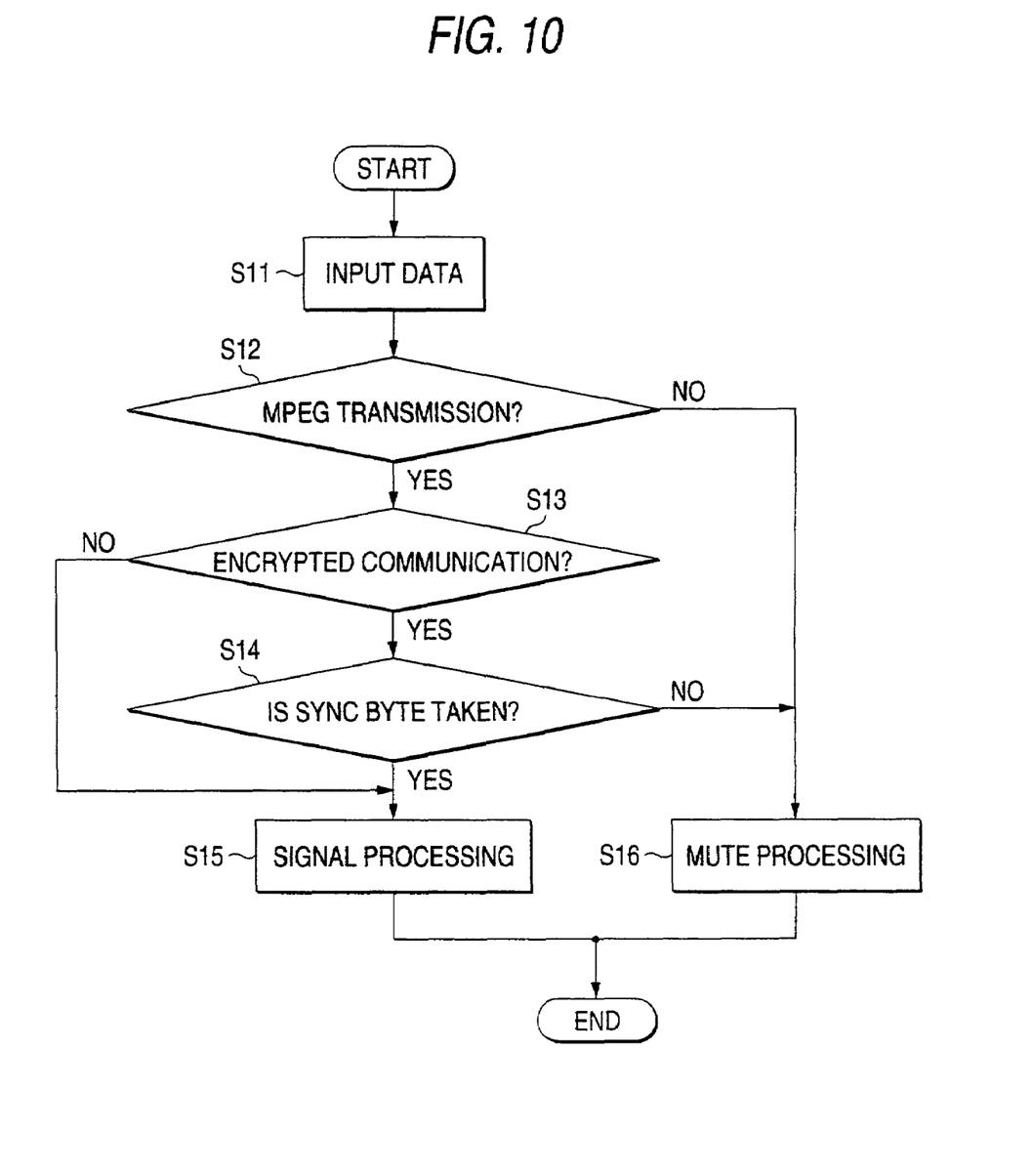
FIG. 10 is a flowchart showing the operation of the IEEE1394 interface.

The operation of the IEEE1394 interface 13 for data transmitted by the MPEG system will be described with reference to the flowchart of FIG. 10. The processing of the steps S11 to S16 of the flowchart shown in FIG. 10 is basically the same as the processing of the steps S1 to S6 of the flowchart shown in FIG. 8. However, in the step S12, it is judged whether the transmission is the MPEG transmission or not. The judgment of the step S12 is carried out by referring to the data written in the FMT field of the CIP header of a packet being decoded.

The judgment as to whether Sync Preamble in step S14 is correctly taken is carried out by referring to the value of Sync byte of the transport packet header shown in FIG. 9. That is, the value of Sync byte of the transport packet header is set to a fixed value of "0x47", and thus on the basis of the judgment as to whether this value is achieved or not, it can be judged in step S14 whether Sync Preamble is correctly taken.

Like the above case, in the mute processing, no data may be output or a null packet in which the PID field value is set to "Ox1FFF" may be output. Further, the cancel of the mute processing at the time when the decoding is accurately carried out is performed in the same manner as described above.

In the above embodiment, the description is made on the assumption that the IEEE1394 bus is used. However, the present invention may be applied to a case where another bus is used. Further, the present invention may be applied to not only digital communications, but also communications such as analog communications, serial communications, parallel communications, etc. Further, the description in the above embodiment is directed to audio data, however, the present invention may be applied to other data.

The above series of processes can be performed by hardware or may be performed by software. When the series of processes is executed by software, a program constituting the software is installed from a recording medium in a computer set up with exclusive hardware or a general personal computer which can execute various functions by installing various programs in the computer.

Figure 11:
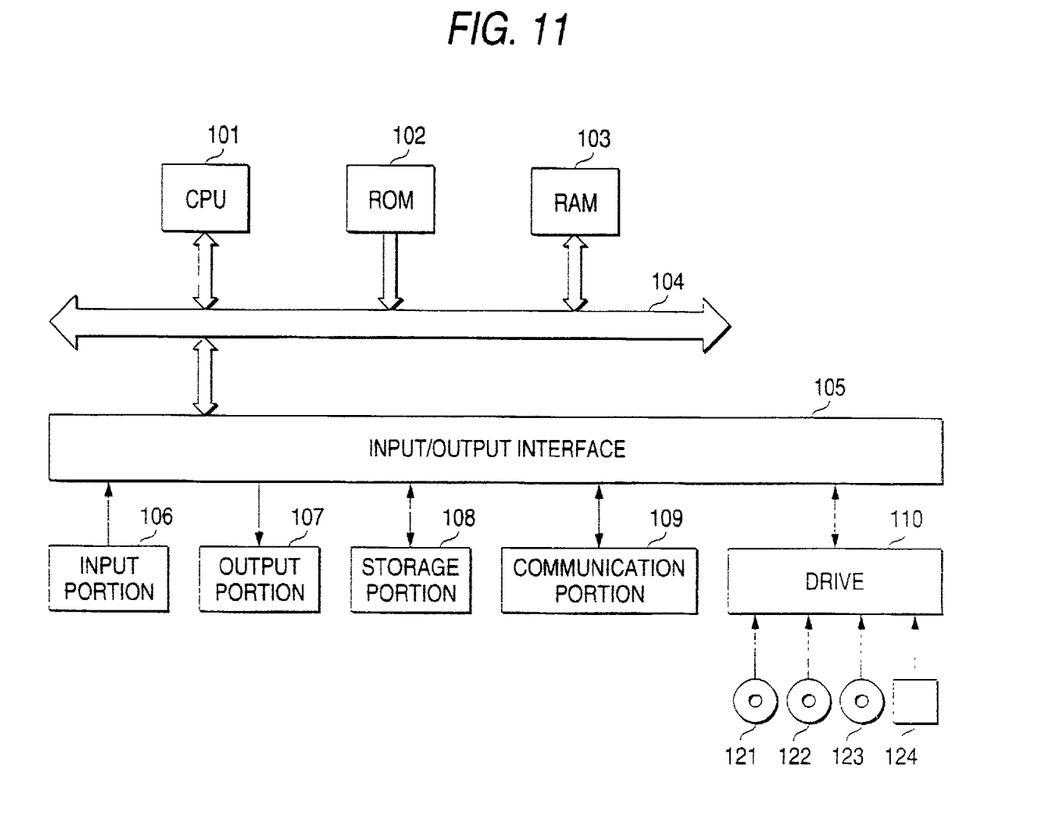
FIG. 11 is a diagram showing a system.

As shown in FIG. 11, this recording medium is constructed not only by a packaged medium such as a magnetic disk 121 (containing a floppy disk), an optical disk 122 (CD-ROM (compact Disk-Read Only Memory), DVD (containing Digital Versatile Disk)), a magnetooptical disk 123 (containing MD (Mini-Disk)), or a semiconductor memory 124 which is distributed to users to supply the program separately from the computer and in which the program is recorded, but also by a hard disk containing ROM 102 or a storage portion 108 which is supplied to users under the state that it is installed in a computer in advance and in which the program is stored.

In this specification, the step of describing the program supplied through the medium contains the processing carried out in time series according to the described procedure, but also the processing that is not necessarily carried out in time series, but carried out in parallel or individually.

In this specification, the system expresses an overall apparatus constructed by plural devices.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An information processing device, comprising:
   an input/output device operable to send and receive data by using a standard digital interface format;
   an encoder operable to encode the data to be sent;
   a decoder operable to decode the received data when the received data is encrypted data;
   a judging unit operable to judge: (i) whether said received data conforms to a IEC60958 standard so as to be audio data, (ii) whether said received data is the encrypted data, and (iii) when said received data is the encrypted data, whether said encrypted data has been properly decoded; and
   means operable to execute mute processing to prevent sound emission when said judging unit determines if any one of the following two items exists: (i) said received data does not conform to the IEC60958 standard, and (ii) said encrypted data has not been properly decoded when said received data is judged to be the encrypted data, and to not execute mute processing when said judging unit does not determine if any one of the two items exists,
   in which said received data has a number of isochronous packets;
   in which said judging unit is operable to judge whether said received data conforms to the IEC60958 standard so as to be audio data by utilizing data in a format ID portion of a CIP header portion of an isochronous packet of said received data, and
   in which said judging unit is operable to judge whether said received data is the encrypted data by utilizing data in a synchronization portion of the isochronous packet header of the isochronous packet of said received data.

2. The information processing device as claimed in claim 1, wherein, when said judging unit judges that said encrypted data has been properly decoded for a predetermined amount of time after the mute processing has been initiated, the mute processing is canceled, whereby the output of said data from said decoder is resumed, in which the predetermined amount of time is approximately 0.5 seconds.

3. The information processing device as claimed in claim 1, wherein the standard digital interface format conforms to a IEEE 1394 standard.

4. An information processing method, comprising the steps of:
   sending and receiving data by using a standard digital interface format;
   encoding the data to be sent;
   decoding the received data when the received data is encrypted data;
   judging whether said received data conforms to a IEC60958 standard so as to be audio data, whether said received data is the encrypted data, and when said received data is the encrypted data, whether the encrypted data has been properly decoded; and
   executing mute processing to prevent sound emission when the judging step determines if any one of the following two items exists: (i) said received data does not conform to the IEC60958 standard, and (ii) the encrypted data has not been properly decoded when said received data is judged to be the encrypted data, and not executing mute processing when the judging step does not determine if any one of the two items exists,
   in which said received data has a number of isochronous packets;
   in which said judging whether said received data conforms to the IEC60958 standard so as to be audio data involves utilizing data in a format ID portion of a CIP header portion of an isochronous packet of said received data, and
   in which said judging whether said received data is the encrypted data involves utilizing data in a synchronization portion of the isochronous packet header of the isochronous packet of said received data.

5. The information processing method as claimed in claim 4, wherein, when the judging step judges that the encrypted data has been properly decoded for a predetermined amount of time after mute processing has been initiated by the executing step, the mute processing is cancelled, whereby the output of the data from the decoding step is resumed, in which the predetermined amount of time is approximately 0.5 seconds.

6. The information processing method as claimed in claim 4, wherein the standard digital interface format conforms to a IEEE 1394 standard.

7. A recording medium recorded with a computer-readable program for information processing, the program comprising the steps of:
   sending and receiving data by using a standard digital interface format;
   encoding the data to be sent;
   decoding the received data when the received data is encrypted data;
   judging whether said received data conforms to a IEC60958 standard so as to be audio data, whether said received data is the encrypted data, and when said received data is the encrypted data, whether the encrypted data has been properly decoded; and
   executing mute processing to prevent sound emission when the judging step determines if any one of the following two items exists: (i) said received data does not conform to the IEC60958 standard, and (ii) the encrypted data has not been properly decoded when said received data is judged to be the encrypted data, and not executing mute processing when the judging step does not determine if any one of the two items exists,
   in which said received data has a number of isochronous packets;

in which said judging whether said received data conforms to the IEC60958 standard so as to be audio data involves utilizing data in a format ID portion of a CIP header portion of an isochronous packet of said received data, and in which said judging whether said received data is the encrypted data involves utilizing data in a synchronization portion of the isochronous packet header of the isochronous packet of said received data.

8. The recording medium recorded with a computer-readable program as claimed in claim 7, wherein, when the judging step judges that the encrypted data has been properly decoded for a predetermined amount of time after mute processing has been initiated by the executing step, the mute processing is cancelled, whereby the output of the data from the decoding step is resumed, in which the predetermined amount of time is approximately 0.5 seconds.

9. The recording medium as claimed in claim 7, wherein the standard digital interface format conforms to a IEEE 1394 standard.

* * * * *